United States Patent [19]
Williamson

[11] Patent Number: 5,903,403
[45] Date of Patent: May 11, 1999

[54] IMAGING SYSTEM USING A COMPOUND ELLIPTICAL CONCENTRATOR

[75] Inventor: James B. Williamson, Sunnyvale, Calif.

[73] Assignee: Hewlett-Packard Company, Palo Alto, Calif.

[21] Appl. No.: 08/788,766

[22] Filed: Jan. 24, 1997

[51] Int. Cl.⁶ ..................................................... G02B 5/10
[52] U.S. Cl. .......................... 359/868; 359/869; 359/363; 359/364; 359/366; 359/726; 359/727
[58] Field of Search ................................... 359/868, 869, 359/363, 364, 366, 726, 727

[56] References Cited

U.S. PATENT DOCUMENTS

| | | | |
|---|---|---|---|
| 4,287,414 | 9/1981 | Soo et al. | 359/868 |
| 4,684,802 | 8/1987 | Hakenewerth et al. | 250/235 |
| 4,699,497 | 10/1987 | Hinton et al. | 355/14 E |
| 4,922,107 | 5/1990 | Rabl et al. | 250/504 R |
| 5,058,982 | 10/1991 | Katzir | 385/33 |
| 5,369,528 | 11/1994 | Rabl et al. | 359/869 |

OTHER PUBLICATIONS

I.M. Bassett et al., "Nonimaging Opticcs for Flux Concentration," *Progress in Optics*, edited by E. Wolf, vol. XXVII, Elsevier Science Publishers B.V., 1989, pp. 163–226.

*Primary Examiner*—Cassandra Spyrou
*Assistant Examiner*—Mohammad Y. Sikder
*Attorney, Agent, or Firm*—Ian Hardcastle

[57] ABSTRACT

An imaging system includes a compound elliptical concentrator having an illumination source at an entry aperture and having an exit aperture directed to project light onto the surface of an object. The compound elliptical concentrator includes first and second reflective surfaces that are arcs of different ellipses. The ellipse that defines the arc of the first reflective surface has one focus that is proximate to an entry end of the second reflective surface. The ellipse that defines the arc of the second reflective surface has a focus that is proximate to the entry end of the first reflective surface. The other foci of the ellipses are at or beyond the exit aperture of the compound elliptical concentrator and are preferably symmetrically aligned with respect to the surface to be imaged. The reflective surfaces are on the opposite sides of a plane of symmetry and are configured such that multiple reflections of extreme rays from the illumination source are deterred. In some embodiments, the light returned from the surface of the object is coupled to a detector along a path that re-enters the compound elliptical concentrator and then passes through an opening in one of the reflective surfaces. The detector may be an electrical sensor or the optical elements of a conventional photocopier.

18 Claims, 7 Drawing Sheets

IMAGING SYSTEM USING A COMPOUND ELLIPTICAL CONCENTRATOR

TECHNICAL FIELD

The invention relates generally to systems for imaging an object and more particularly to optical arrangements for illuminating an object and for detecting light returned from the object.

BACKGROUND ART

In a wide variety of devices in various fields, an object is illuminated with a high-intensity illumination in a long, narrow illumination pattern, i.e., an "elongate" is illumination pattern, and the light returned from the illuminated portion of the object is detected. For example, in a scanner or photocopier, the object illuminated is a document, and the light returned from the illuminated portion of the document is detected by focusing this light on a CCD in a scanner or on a light-sensitive drum in a photocopier. Other applications of object imaging include surface inspection devices, such as those used in the electronics industry. Object imaging also includes applications in which the total flux of the light reflected by the illuminated portion of the object is detected and no image formed at the detector. To simplify the following description, the word "imaging" will be taken to include these applications in which the total light flux is detected and no image is actually formed at the detector.

Conventional scanners and photocopiers often utilize linear extended light sources, such as fluorescent lamps. The light emitted by the lamp must be transferred to the object so that it provides a high illumination intensity within the elongate illumination pattern. The illumination intensity must be sufficiently high for the light returned from the illuminated part of the object to have sufficient intensity to allow the returned light to be detected reliably. For example, in a scanner, insufficient light intensity at the document results in the detected image having an unacceptable signal-to-noise ratio.

Since the light sources of conventional scanning and photocopying systems are lambertian and not directional, much of the light generated by the light source does not impinge the region of the surface of the object that is to be imaged. A high-power illumination assembly is often used to ensure that the illumination intensity at the object is adequate. Since the cost of the power supply of the illumination assembly is a significant part of the overall cost of the system, the cost of illuminating the object with low efficiency translates directly to cost inefficiency.

The inefficiency of an illumination assembly for imaging an object can be reduced by providing reflective surfaces near the light source. U.S. Pat. No. 4,699,497 to Hilton et al. describes an illumination assembly for a document scan system that includes a long, cylindrical lamp partially enclosed by a pair of reflectors that constitute two arcs of a single ellipse. The lamp emits light through 360°. The patent states that the prime requirement for placing the lamp relative to the elliptically-shaped reflectors is to locate the center of the lamp at one of the foci of the ellipse of which the reflectors constitute arcs. The reflectors concentrate and redirect the light emitted by the lamp, and so enhance the efficiency of the illumination assembly.

Another system that uses reflective surfaces to define an illumination field for an optical scanner is described in U.S. Pat. No. 5,058,982 to Katzir. The Katzir optical scanner is a system for inspection of printed circuit boards, wafers and the like. Each of two elongate light sources has a reflective focusing member and a lenticular lens sheet that spreads the light from its light source over the associated reflector focusing member. The illumination system also includes a third elongate light source that is used to produce a bright-field illumination.

While the prior art imaging systems of Hilton et al. and Katzir improve the efficiency of illumination, further performance enhancements are desired.

Other illumination assemblies place a fluorescent aperture lamp close to the surface of the object to be imaged. The aperture lamp includes an internal reflector, and emits light from an elongate aperture disposed along the length of the lamp. The light emitted from the aperture has a substantially higher intensity than the light emitted by an equivalent non-aperture fluorescent lamp. However, in the plane perpendicular to the length of the lamp, an aperture lamp emits light through an angle of 180 degrees. Thus, such lamps provide an elongate illumination pattern on a nearby object at only a low efficiency because most of the light emitted by the lamp falls outside the illumination pattern. Increasing the efficiency of such lamps requires as much of the light emitted in the 180° angle as possible be captured and concentrated to form the illumination pattern on the object. Conventional reflectors or lenses capable of performing this task are expensive and bulky.

Compound elliptical concentrators ("CECs") are known in the art for illuminating distant objects using a plane source of radiation. A device for spreading infra-red radiation from a plane source symmetrically over a distant extended target is described in U.S. Pat. No. 4,922,107 of Rabl et al. The CEC collects all the radiation emitted through a 180° angle by the plane infrared source.

What is needed is a way to adapt a CEC to illuminate a narrow strip of a nearby object with the light from an aperture lamp in a manner that enables the light returned from the illuminated portion of the object to be coupled to a suitable detector.

SUMMARY OF THE INVENTION

The invention provides an imaging system that uses a compound elliptical concentrator to direct light from an elongate illumination source to form an elongate illumination pattern on a surface of an object to be imaged. A coupling element couples light returned from the surface to a detector. In the preferred embodiment, the illumination source is an aperture lamp. The compound elliptical concentrator includes first and second reflective surfaces that are arcs of different ellipses. The ellipse that defines the arc of the first reflective surface has one focus proximate to the junction of the lateral extreme of the illumination source and the an entry end of the second reflective surface. The ellipse that defines the second reflective surface has one focus proximate to the junction of a second lateral extreme of the illumination source and the entry end of the first reflective surface. Each ellipse has a second focus located either coincident with or beyond the exit ends of the reflective surfaces of the compound elliptical concentrator.

In a first embodiment of the imaging system, the compound elliptical concentrator has a plane of symmetry perpendicular to the surface of the object, is "untruncated," and includes coupling element that passes through the interior of the compound elliptical concentrator. In this disclosure, a compound elliptical concentrator is defined as being "untruncated" when extreme rays from the lateral extremes of the illumination source are extreme rays at the exit aperture of the concentrator. A "truncated" compound elliptical concentrator is one in which one or both of the reflective surfaces have abbreviated lengths that do not satisfy the extreme ray condition.

In the first embodiment, the compound elliptical concentrator is located with its exit aperture juxtaposed to the surface of the object to be imaged so as to maximize the illumination intensity of the surface of the object. The coupling element couples light returned from the object to the detector. The coupling element may include an opening formed in one or both of the reflective surfaces through which the returned light reaches the detector. The coupling element of the first embodiment may also include an internal mirror, since the plane of symmetry of the compound elliptical concentrator is perpendicular to the surface of the object. The detector may generate signals representative of the features on the surface (e.g., print on a document), or may generate signal representative of the total light flux returned from the surface, or may be conventional photocopy optics and mechanics.

Other embodiments vary from the first embodiment with respect to the angle of the compound elliptical concentrator relative to the surface of the object, the truncation of one or both of the reflective surfaces, the symmetry of the ellipses of which the reflective surfaces constitute arcs, and whether the coupling element extends into the interior of the compound elliptical concentrator. The preferred embodiment is similar to the first embodiment, but the plane of symmetry of the compound elliptical concentrator is at an angle to the surface of the object, and the coupling element directs the light returned from the surface to the detector via an opening in one of the reflective surfaces. This arrangement eliminates any need to support an internal mirror for redirecting the returned light toward the opening.

Optionally, the coupling element may include an optical arrangement located inside the interior of the compound elliptical concentrator to collect and focus the returned light for passage through the opening in the reflective surface. It has been determined that the numerical aperture associated with these embodiments is sufficiently small, typically less than 0.5, so that the opening in the reflective surface does not significantly affect the operation of the compound elliptical concentrator in providing a high flux transfer ratio between the light that illuminates the surface of the object and the light that enters the compound elliptical concentrator from the light source.

The flux transfer from the light source to the surface of the object is a maximum when the dimensions of the exit aperture, the entry aperture and the illumination field at the surface of the object are equal. For embodiments in which the compound elliptical concentrator is tilted relative to the surface, the two foci located at the exit aperture are preferably located on opposite sides of the surface and equidistantly spaced from the surface.

As previously noted, embodiments of the invention vary with respect to the configuration of the coupling element that couples the light returned from the surface of the object to the detector. In some embodiments, the exit ends of the reflective surfaces of the concentrator are spaced apart from the surface of the object to allow the returned light to be coupled to the detector without passing through the interior of the compound elliptical concentrator. This can be achieved in either a truncated or an untruncated embodiment. Moreover, the axis of the concentrator may be perpendicular to the surface or tilted relative to the surface of the object.

An advantage of the invention is that the compound elliptical concentrator establishes a high efficiency of flux transfer. This translates into benefits with respect to any or all of performance, cost efficiency and space efficiency. Performance is enhanced by increasing the illumination at the surface of the object, so that more detectable light is returned from the surface. On the other hand, the high efficiency of flux transfer may be employed to allow use of a less expensive power supply for the imaging system, while maintaining the light intensity at the surface. For hand-held scanning applications and other applications in which size is a concern, the reduced demands on the power supply allow a system designer to use a power supply having a smaller footprint than systems without the compound elliptical concentrator.

DETAILED DESCRIPTION OF THE INVENTION

Figure 1:
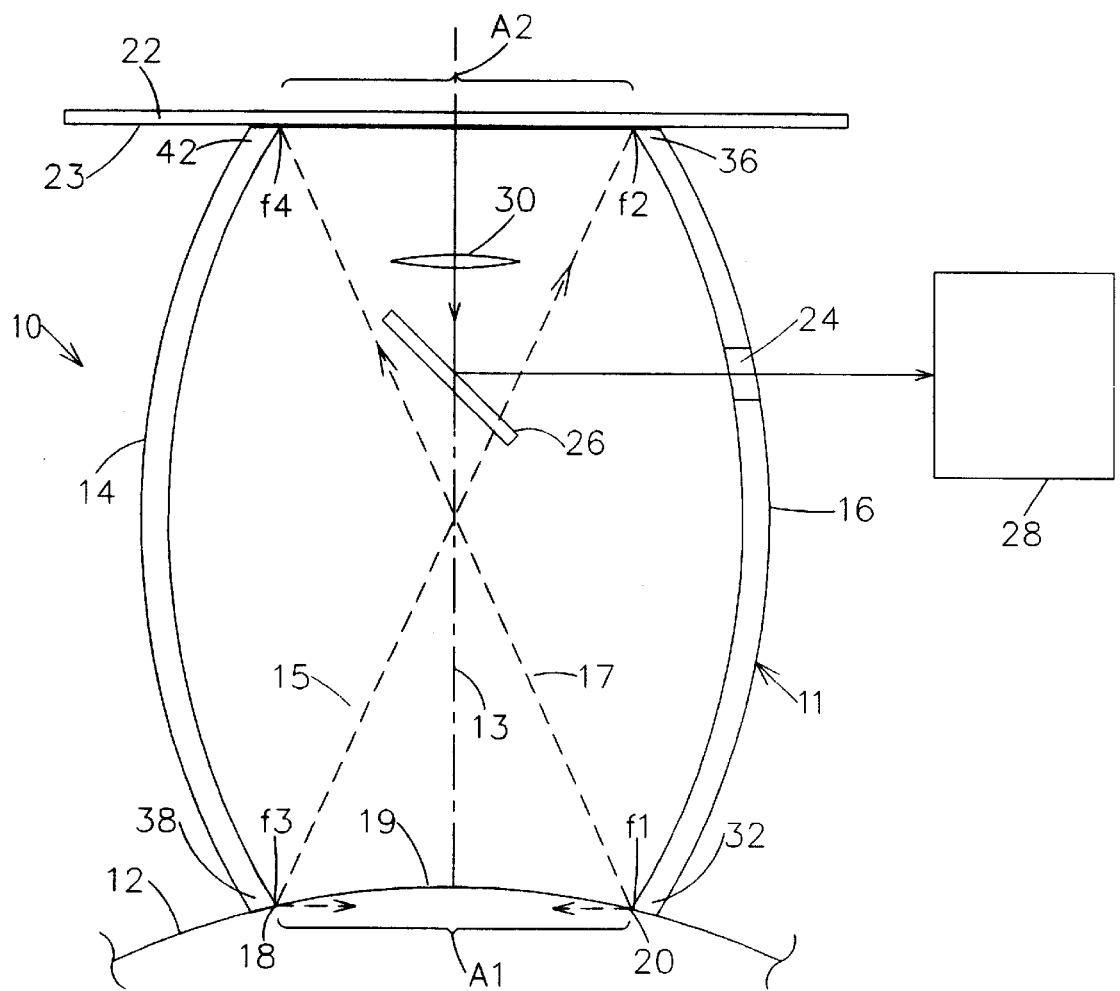
FIG. 1 is a side schematic view of one embodiment of an imaging system having a compound elliptical concentrator (CEC), in accordance with the invention.

A first embodiment of an imaging system according to the invention is shown in FIG. 1. The imaging system 10 includes the elongate light source 12 and the compound elliptical concentrator ("CEC") 11 having a first reflective surface 14 and a second reflective surface 16. The imaging system is shown as illuminating a strip of the surface 23 of the object 22. The illuminated strip and the light source are elongate in a direction perpendicular to the plane of the drawing.

The preferred light source 12 is a fluorescent aperture lamp that extends longitudinally along the plane of symmetry of the compound elliptical concentrator. The plane of symmetry extends perpendicular to the plane of the drawing through the axis of symmetry 13. One form of fluorescent aperture lamp is described in A U.S. Pat. No. 3,115,305 of Spencer et al. The fluorescent aperture lamp emits light from the window 19. The boundaries of the window are indicated by the reference numerals 18 and 20. The window is elongate in the direction perpendicular to the plane of the drawing. Light is emitted from the window 19 through an angle of about 180°. While the invention is described and illustrated as having a fluorescent aperture lamp as the light source 12, other suitable elongate light sources may be used. A non-aperture fluorescent lamp, a linear array of light-emitting diodes and a strip of electroluminescent material are examples of suitable alternatives.

The light source 12 is mounted adjacent the compound elliptical concentrator 11 with the window 19 aligned with the entry aperture A1. The side extremes of the window 19 are indicated by the reference numerals 18 and 20. The CEC additionally has the exit aperture A2 at the end of the CEC remote from the entry aperture. A suitable structure (not shown) disposes the CEC adjacent the object 22 so that light emitted from the exit aperture falls on a portion of the surface 23 of the object.

The compound elliptical concentrator 11 collects light from the elongate light source 12 and concentrates it onto a portion of the 23 surface of the object 22 to be imaged. For example, if the object 22 is a document, the CEC concentrates the light from light source to illuminate an elongate strip of the surface of the document. The CEC can be structured and can be mounted with its exit aperture A2 juxtaposed to the object such that the CEC provides a light flux at the object substantially equal to the light flux at the entry aperture A1. However, when this condition is met, light that is returned from the surface of the object 22 returns into the interior of the CEC, and is unable to escape from the CEC.

The compound elliptical concentrator 11 shown in FIG. 1 may be used in the imaging system 10 by forming an opening 24 through the second reflective surface 16 and by mounting the mirror 26 in the interior of the CEC. The opening and the mirror collectively couple the light returned from the surface 23 of the object 22 to the detector 28. The light returned from the surface 23 is returned by a combination of specular and diffuse reflection. The light returned from the surface 23 impinges on the mirror, which directs this light through the opening to the detector. In the preferred embodiment, the dimensions of the mirror 26 are small compared with the cross-sectional area of the CEC in the vicinity of the mirror. The mirror also preferably has a matt-black back to prevent spurious reflections from the back of the mirror.

While not critical, one or more optical elements 30 may be used to collect and focus the light returned from the surface of the object to impinge the mirror 26.

The term "detector" is used in this disclosure to identify any electrical or optical component or arrangement of components that receives the light returned from the surface of the object. In most applications, an image of the surface of the object is formed at the detector. However, in applications in which the detector simply detects the total light flux returned from the surface of the object, no image is formed. However, as noted above, the term "imaging" will be regarded as encompassing light detection regardless of whether an image is formed at the detector.

When the imaging system 10 is used in a scanner, for example, the detector 28 may include a linear array of sensors aligned with the opening 24. The sensors generate an electrical signal in response to the light returned from the surface 23 of the object 22, a document in this example. When the imaging system is used in a photo copier, the detector 28 may be an optical arrangement that forms a latent image on another surface, such as a surface of an electrostatic drum, in response to the light returned from the surface 23. The latent image can then be transferred to a second sheet of paper. In this example, the detector 28 may comprise conventional components of a photocopier. As a further example, the detector may be a photodiode or light sensor that detects the integral of the light returned from the surface 23.

An advantage of the compound elliptical concentrator 11 is that the arrangement of the first and second reflective surfaces 14 and 16 provides a high ratio between (a) the output light flux impinging on the surface 23 of the object 22 from the exit aperture A2 and (b) the input light flux at the entry aperture A1. The first and second reflective surfaces 14 and 16 are arcs of different ellipses. The ellipse of which the first reflective surface is an arc has a first focus (f1) at the junction of the entry end 32 of the second reflective surface and the extreme 20 of the window 19 of the light source 12. The light source 12 propagates light into the compound elliptical concentrator through the window 19. The second focus of the first reflective surface is at one end of the exit aperture A2 of the CEC. In the embodiment shown in FIG. 1, the second focus (f2) is at the intersection of the extreme ray 15 and the surface of the object 22. In this embodiment, the extreme ray is at or near the contact of the exit end 36 with the surface 23 of the object 22.

The ellipse of which the second reflective surface 16 is an arc has third and fourth foci. The third focus (f3) is at the junction of the entry end 38 of the first reflective surface 14 and the extreme 18 of the window 19 of the light source 12. The fourth focus (f4) is at the intersection of the extreme ray 17 and the region of the object 22 that contacts the exit end 42 of the first reflective surface.

Since both of the first and second reflective surfaces 14 and 16 are untruncated, the extreme rays 15 and 17 are at grazing angles to the exit ends 36 and 42, and width of the exit aperture A2 corresponds to the distance between the foci f2 and f4. This arrangement prevents multiple reflections of the extreme rays within the concentrator. The flux transfer provided by the imaging system shown in FIG. 1 is significantly greater than that of conventional imaging systems. For example, the illumination intensity provided by a practical embodiment of the illumination system according to the invention using a fluorescent aperture lamp as the light source 12 was four to five times greater than that provided by the fluorescent aperture lamp alone. Alternatively, the practical embodiment of the illumination system according to the invention was able to provide an acceptable illumination intensity using a fluorescent aperture lamp having a light output of less than one fourth of that required to provide the same illumination intensity using the fluorescent aperture lamp alone.

The embodiment shown FIG. 1 illustrates the preferred dimensional relationship among the entry aperture A1, the exit aperture A2 and the illumination field at the surface 23 of the object 22. This preferred embodiment has a one-to-one dimensional correspondence. Thus, the width of the exit aperture A2, i.e., the distance between the exit-end foci f2 and f4 is equal to the width of the entry aperture A1, i.e., the distance between the entry-end foci f1 and f3. Moreover, the width of the illumination field is substantially the same as that of the exit aperture A2.

The untruncated structure of the compound elliptical concentrator 11 shown in FIG. 1 distinguishes this embodiment from other embodiments having truncated concentrators that will be described below. Another distinguishing feature among the embodiments is that the compound elliptical concentrator need not be symmetrical. In other words, the two ellipses of which the reflective surfaces are arcs need not necessarily be equal in dimensions. An asymmetrical embodiment will be described below with reference to FIG. 7. Another distinguishing feature is that, in some embodiments, the axis of symmetry of the compound elliptical concentrator is perpendicular to the surface of the object, while other embodiments have a tilted CEC in which the axis of symmetry is not perpendicular to the surface of the object. Two other distinguishing features involve whether light returned from the surface of the object and coupled to the detector 28 passes through the interior of the concentrator, and the relationship among the dimensions of the entry aperture, the exit aperture and the illumination field.

Figure 2:
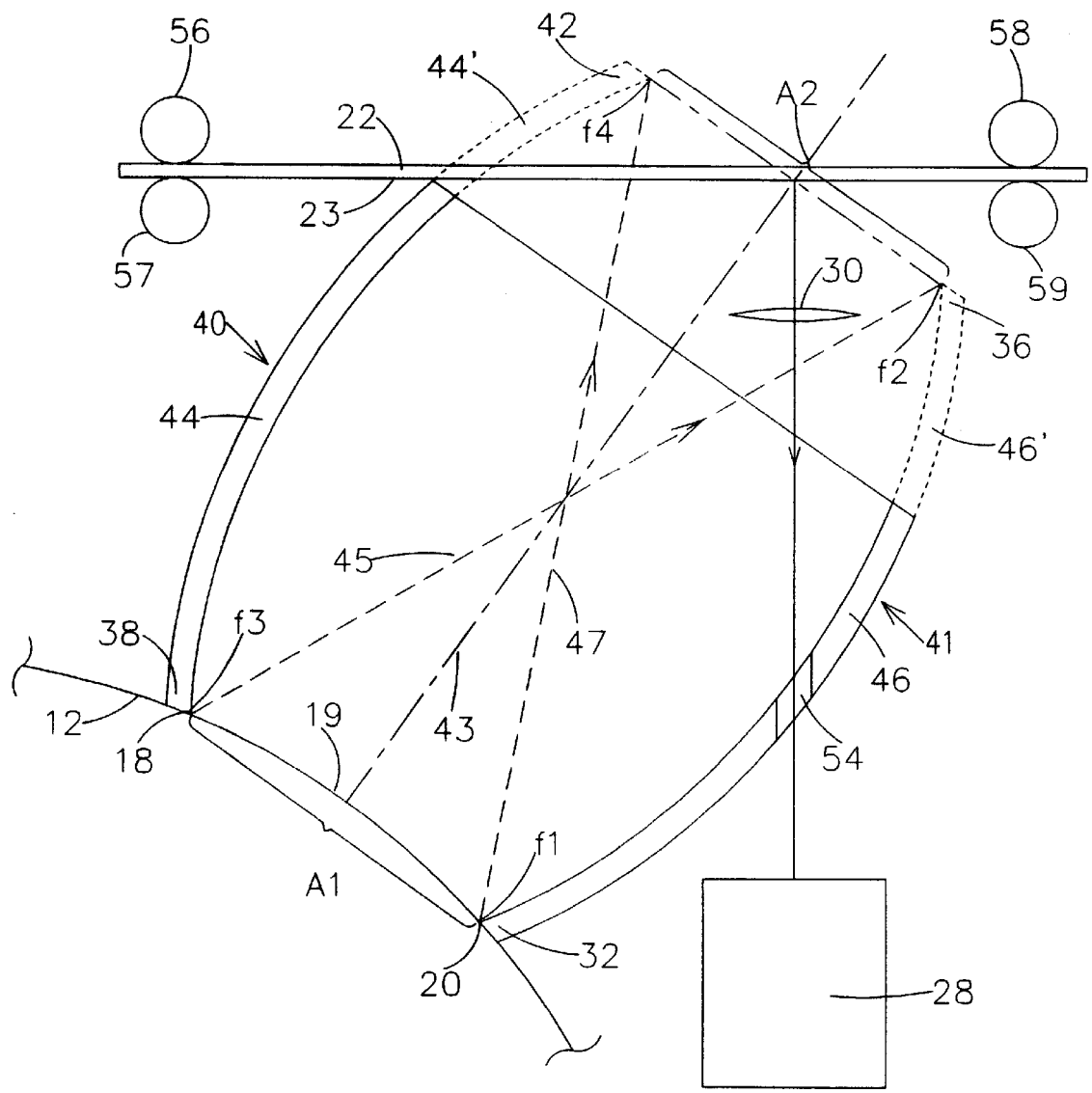
FIG. 2 is a side view of the preferred embodiment of an imaging system having a compound elliptical concentrator, with the concentrator being tilted relative to the surface of the object.

A second embodiment of the invention is shown in FIG. 2. In the imaging system 40, the plane of symmetry of the compound elliptical concentrator 41 is tilted relative to the surface of the object 22. The plane of symmetry extends perpendicular to the plane of the drawing through the axis of symmetry 43. In this embodiment, the CEC is truncated, at least partially, as will be described below. The CEC is composed of the first and second reflective surfaces 44 and 46. The second reflective surface defines the opening 54 through which the light returned from the surface of the object is coupled to the detector 28. As in the embodiment shown in FIG. 1, the detector may be an electrical device, such as a CCD or a photodiode, or may be the components of a conventional photocopier. The light coupled to the detector may or may not form an image at the detector. As noted above, optical elements 30 that collect the light returned from the surface 23 may be used to increase the intensity of the light coupled to the detector.

In the embodiment shown in FIG. 2, the object 22 is shown as being supported between rollers 56, 57, 48 and 59 that progress the object along the illumination field formed by the compound elliptical concentrator 41. However, this is not critical. The CEC and the light source 12 may be housed within a hand-held scanner that is manually maneuvered along the surface 23 of the object. Alternatively, the light source and the CEC may be mechanically moved relative to the surface of a fixed object. The other embodiments described herein may include similar arrangements for scanning the surface of the object.

An advantage of the embodiment shown in FIG. 2 is that the alignment of the opening 54 relative to the surface 23 of the object 22 eliminates the need for an internal mirror 26 of the type shown in FIG. 1. Another advantage is that tilting the compound elliptical concentrator and leaving a gap between the surface 23 and at least one of the reflective surfaces 44 and 46 reduces the susceptibility of the system to flare. Flare is a reduction of contrast that occurs as a result of the light returned from the lighter parts of the surface 23 being reflected back to the surface 23 by the reflective surfaces 14 and 16 of the CEC and by the interior surface of the aperture lamp 12. The reflected light illuminates the darker parts of the surface 23 with a greater-than-normal intensity. The greater-than-normal illumination intensity makes the darker parts of the surface appear lighter, and therefore reduces contrast. Flare is reduced because less of the light returned by the surface 23 enters the interior of the CEC. The likelihood of flare can be further reduced by further truncating the reflective surfaces 44 and 46.

Tilting the axis of symmetry 43 of the compound elliptical concentrator 41 requires that the reflective surface 44 be truncated to enable the object 22 to be located in its correct positional relationship to the exit aperture A2. The reflective surface 46 is also shown truncated in FIG. 2 although it is not necessary that this surface be truncated. FIG. 2 shows the phantom portions 44' and 46', which are the parts of the reflective surfaces 44 and 46 that are absent as a result of the reflective surfaces being truncated. If the reflective surfaces included the phantom portions, light rays from the lateral extremes 32 and 38 of the entry aperture A1 would be extreme rays at the exit aperture ends 42 and 36 of the phantom portions 44' and 44'.

The exit end focus of the ellipse of which the first reflective surface 44 is an arc is shown at f2 of FIG. 2, and the exit end focus of the ellipse of which the second reflective surface 46 is an arc is shown at f4. In the preferred embodiment, the width of the exit aperture A2, i.e., the distance between the exit-end foci f2 and f4, is equal to the width of the entry aperture A1, i.e., the distance between the entry-end foci f1 and f3. In this preferred embodiment, the exit end foci f2 and f4 are located on opposite sides of the surface 23 of the object 22, and are equidistant from the surface 23.

Figure 3:
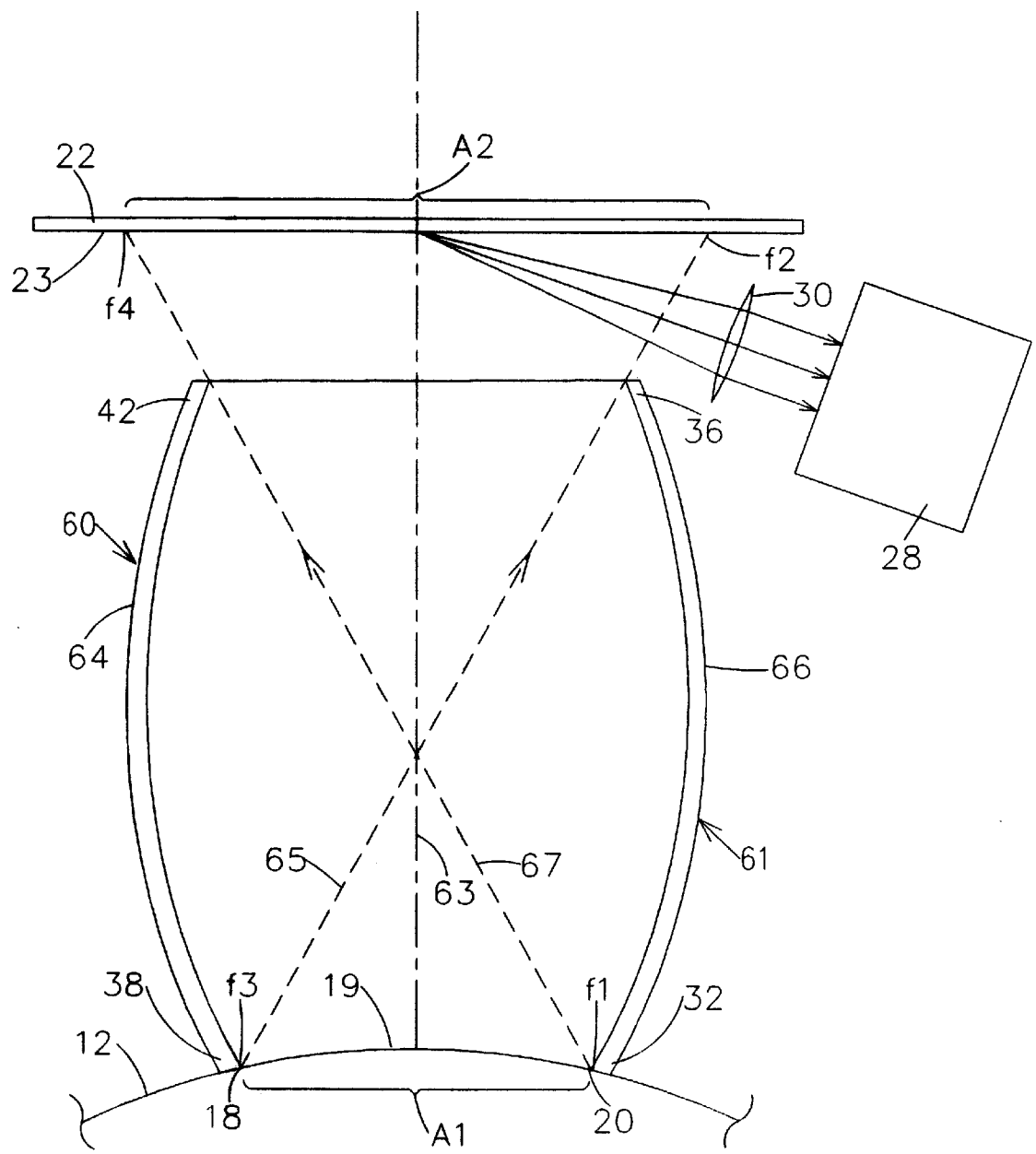
FIG. 3 is a side schematic view of an imaging system having an untruncated, perpendicularly-aligned compound elliptical concentrator, with a detector being positioned to receive light returned from the object without passing back into the CEC.

FIG. 3 shows the imaging system 60 having the untruncated compound elliptical concentrator 61 composed of the first and second reflective surfaces 64 and 66. Rather than having an opening through one of the reflective surfaces, the exit ends 36 and 42 of the reflective surfaces are spaced apart from the surface 23 of the object 22 to couple the light returned from the surface 23 to the detector 28 without the returned light passing back into the CEC 61.

The detector 28 may be an electrical device, such as a CCD or a photodiode, or may be the components of a conventional photocopier. The light coupled to the detector may or may not form an image at the detector. As noted above, optical elements 30 that collect the light returned from the surface 23 may be used to increase the intensity of the light coupled to the detector.

Because the exit ends of the reflective surfaces 64 and 66 are spaced apart from the surface 23, the width of the exit aperture A2 at the surface 23 will be greater than the width of the entry aperture A1, i.e., the distance between the entry-end foci f1 and f3. Consequently, the illumination intensity at the surface 23 produced by the embodiment shown in FIG. 3 will be less than in the embodiments in which the width of the exit aperture is equal to the width of the entry aperture. The embodiment shown in FIG. 3 may be referred to as an untruncated, symmetrical, perpendicularly-aligned system in which the illumination field is larger than the entry aperture of the compound elliptical concentrator.

The embodiment shown in FIG. 1 can be adapted to couple the light returned from the surface 23 of the object 22 to the detector 28 without the returned light passing back into the compound elliptical concentrator 11. This is done by moving the CEC 11 back from the object 22 to space the ends 36 and 42 of the reflective surfaces 14 and 16 apart from the surface 23 of the object. Supporting the CEC 13 with the ends of the reflective surfaces spaced apart from the surface 23 couples the light returned from the surface 23 to the detector without the returned light passing back into the CEC. However, this arrangement may not produce as high an intensity at the surface 23 as the embodiment shown in FIG. 3 because not all of the light leaving the exit aperture A2 of the CEC 11 falls on the surface 23. In the FIG. 3 embodiment, all of the light leaving the exit aperture A2 falls on the surface 23. In the FIG. 1 embodiment, the extreme rays leave the exit aperture parallel to the surface 23 and therefore do not fall on the surface 23 when the CEC 11 is moved back from the surface.

The embodiment shown in FIG. 1 can be better adapted to couple the light returned from the surface 23 of the object 22 without the returned light passing into the compound elliptical concentrator by truncating the reflective surfaces of the CEC. The CEC otherwise has the same structure as that of the embodiment shown in FIG. 1 and is supported in the same position relative to the surface 23. Such an imaging system 70 is shown in FIG. 4.

In the imaging system 70, the compound elliptical concentrator 71 is similar in structure to the CEC 11 shown in FIG. 1, but the first and second reflective surfaces 74 and 76 are truncated. The phantom portions 74' and 76' shown in FIG. 4 indicate the parts of the reflective surfaces 74 and 76 that are absent as a result of the reflective surfaces being truncated.

Figure 4:
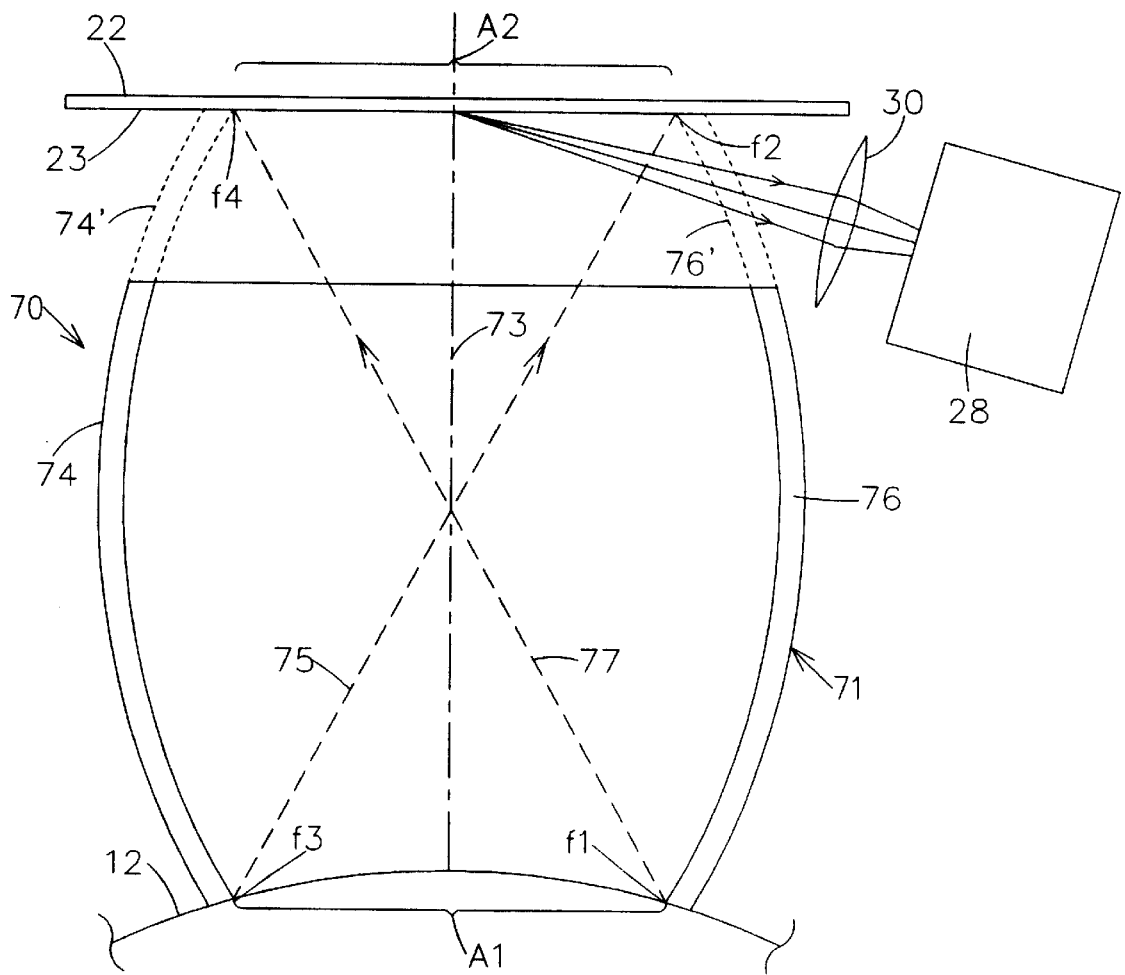
FIG. 4 is a schematic view of an imaging system having a truncated, perpendicularly-aligned compound elliptical concentrator, with a detector being positioned to receive light returned from the object without passing back into the CEC.

Since the ellipses of which the reflective surfaces 74 and 76 are arcs are the same as the ellipses of which the reflective surfaces 14 and 16 shown in FIG. 1 are arcs, and the distance between the light source 12 and surface 23 shown in FIG. 4 is the same as that between the light source 12 and the surface 23 shown in FIG. 1, the positions of the foci f1, f2, f3 and f4 are the same in both embodiments. The width of the exit aperture A2, i.e., the distance between the exit-end foci f2 and f4, is therefore equal to the entry aperture A1, i.e., the distance between the entry-end foci f1 and f3. Consequently, the illumination intensity at the surface 23 is a maximum. As previously noted, truncating the compound elliptical concentrator 71 reduces the likelihood of flare adversely affecting performance of the imaging system.

Truncating the compound elliptical concentrator 71 couples the light returned from the surface 23 of the object 22 to the detector 28. The detector may be an electrical device, such as a CCD or a photo-diode, or may be the components of a convnentional photocopier. The light coupled to the detector may or may not form an image at the detector. As noted above, optical elements 30 that collect the light returned from the surface 23 may be used to increase the intensity of the light coupled to the detector.

Figure 5:
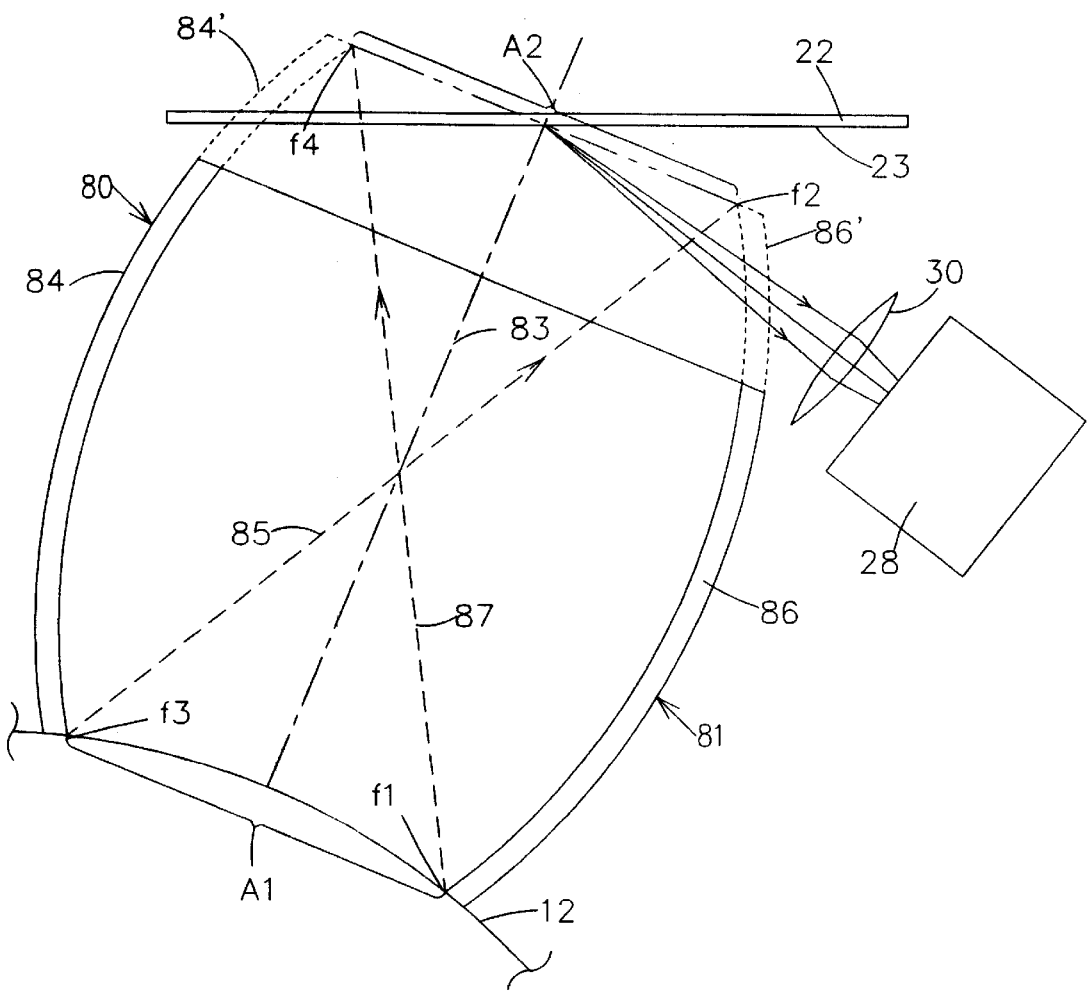
FIG. 5 is a side schematic view of an imaging system having a truncated and tilted compound elliptical concentrator, with a detector being positioned to receive light returned from the object without passing back into the CEC.

The imaging system 80 shown in FIG. 5 has the symmetrical, truncated compound elliptical concentrator 81 composed of first and second reflective surfaces 84 and 86. In this embodiment, the CEC is tilted so that the axis of symmetry 83 of the CEC is at a non-zero angle to the normal to the surface 23 of the object 22. In this embodiment, the width of the exit aperture A2, i.e., the distance between the exit-end two foci f2 and f4 is again equal to the width of the entry aperture A1, i.e., the distance between entry-end foci f1 and f4. This provides a maximum flux transfer from the light source 12 to the surface 23. The CEC is located relative to the surface 23 such that the exit end foci f2 and f4 are on opposite sides of the surface 23, and are equidistant from this surface. Again, truncating the reflective surfaces reduces flare.

Spacing the ends of the reflective surfaces 84 and 86 apart from the surface 23 of the object 22 couples the light returned from the surface 23 to the detector 28 without the returned light passing into the CEC 81. The detector may be an electrical device, such as a CCD or a photo-diode, or may be the components of a conventional photocopier. The light coupled to the detector may or may not form an image at the detector. The optical elements 30 that collect the light returned from the surface 23 may be used to increase the intensity of the light coupled to the detector.

Figure 6:
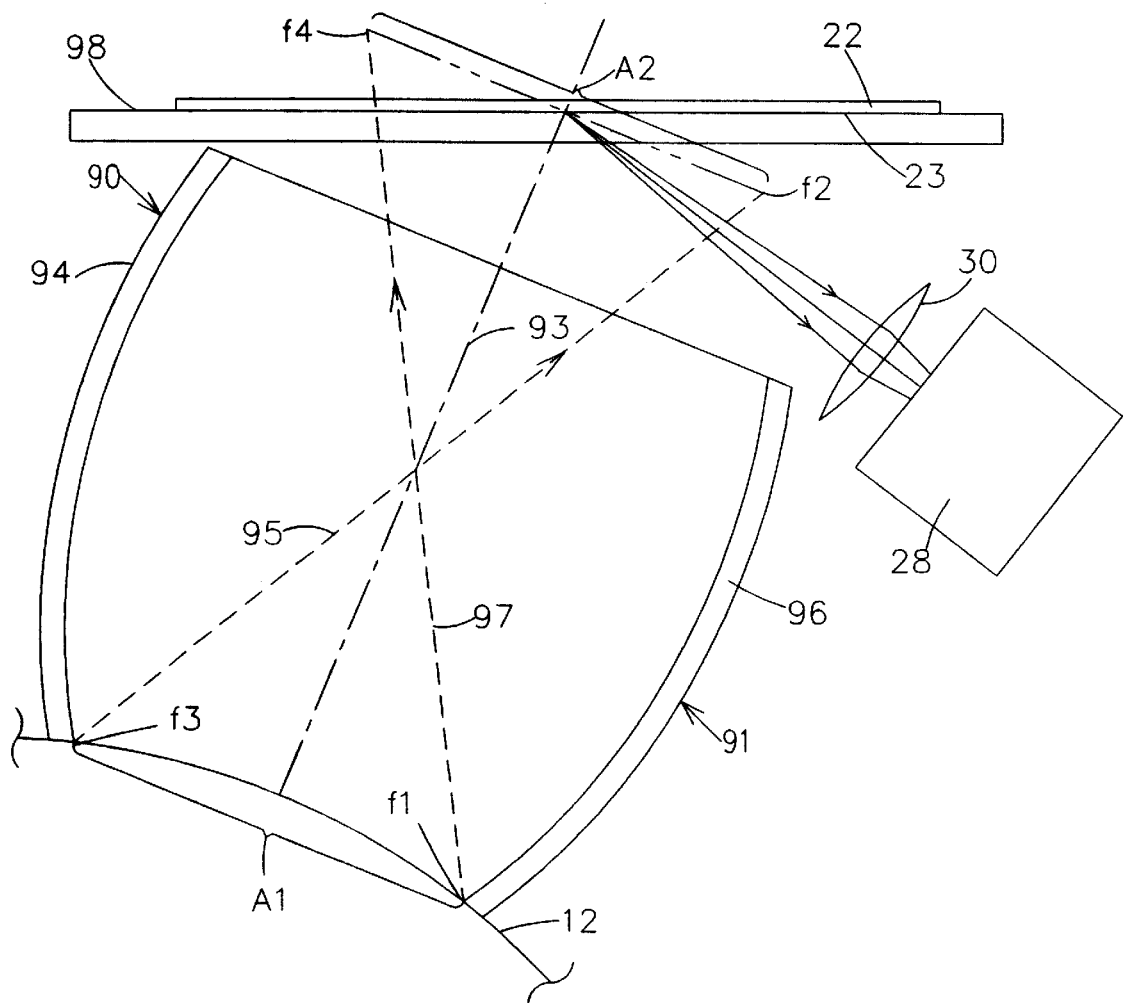
FIG. 6 is a side schematic view of an imaging system having a truncated and tilted compound elliptical concentrator that is positioned relative to a platen glass with a detector being positioned to receive light returned from the object without passing into the CEC.

The embodiment shown in FIG. 6 indicates how the embodiment shown in FIG. 5 is modified when the object 22 is supported by the transparent support 98, such as when the object 22 is a document to be scanned or copied, and is supported on the glass platen of a scanner or photocopier. Similar modifications to the other embodiments shown in this disclosure are necessary when the object is illuminated by the light from the CEC passing through a transparent support.

In the embodiment shown in FIG. 6, the imaging system 90 includes the compound elliptical concentrator 91 mounted juxtaposed to the glass platen 98 that supports the object 22. The imaging system 90 is substantially identical to that of the imaging system described above with reference to FIG. 5 and so it will not be described in detail. However, when the object is illuminated by light passing through the transparent platen 98, the index of refraction of the material of the platen must be considered in order to maximize performance. To maximize the illumination of the object, the width of the exit aperture A2 should still be equivalent to the width of the entry aperture A1, and the exit aperture should be centered on the surface 23 of the object 22. However, if the CEC 91 is located in the same position relative to the object as in the embodiment shown in FIG. 5, refraction in the platen will displace the exit aperture relative to the object. To correct this displacement, the CEC should be positioned further away from the object and displaced to the right to re-center the exit aperture on the object. The amount by which the CEC should be displaced depends on the thickness of the platen, the refractive index of the material of the platen and the angle between the axis of symmetry 105 and the platen.

Figure 7:
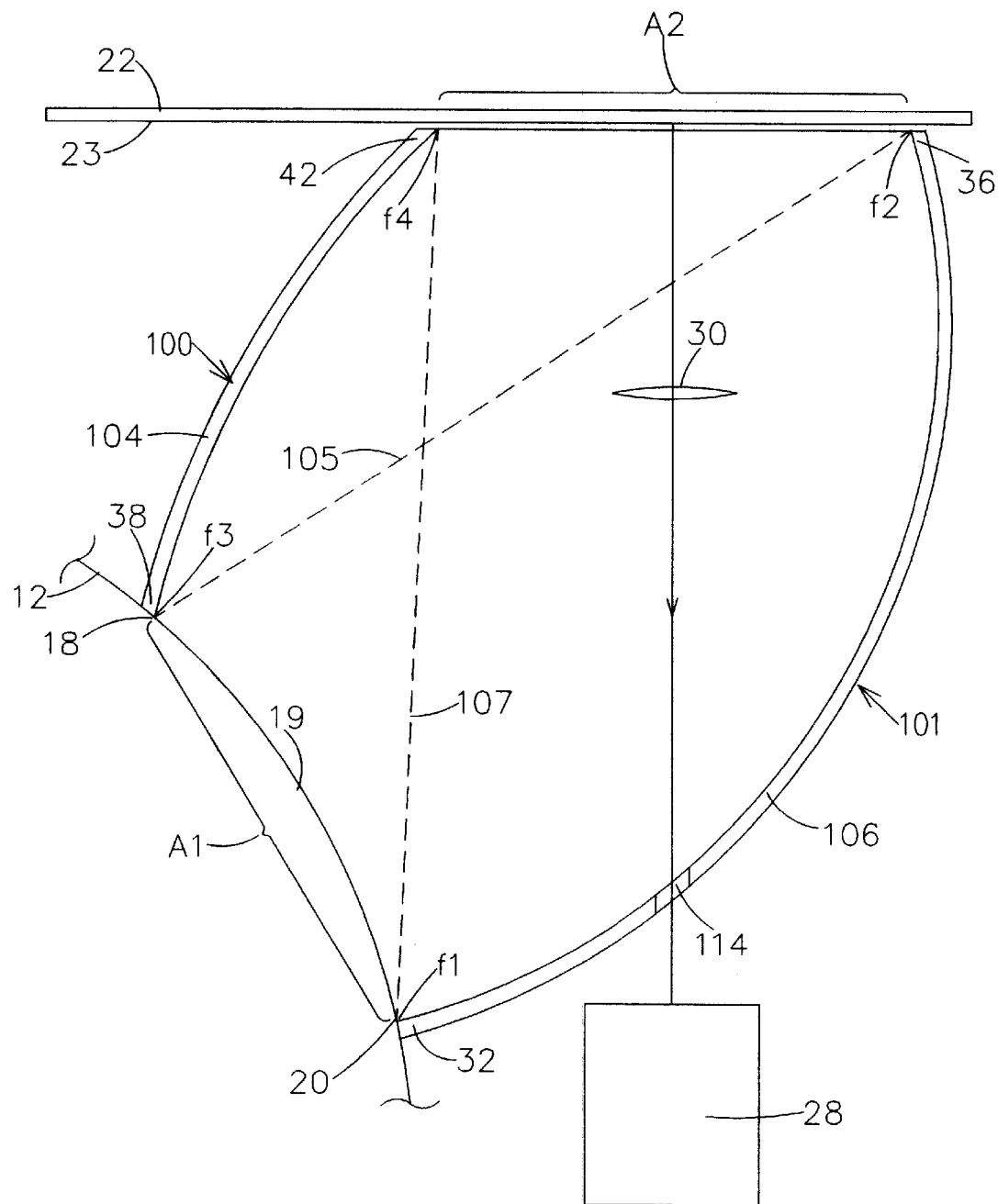
FIG. 7 is a side schematic view of an imaging system having an asymmetrical compound elliptical concentrator with a detector being positioned adjacent an opening in the CEC to receive light returned from the object.

In the embodiments shown so far, the compound elliptical concentrators have been symmetrical. However, there is no requirement that the CEC be symmetrical. Asymmetrical CECs may also be used. An assembly composed of an asymmetrical CEC attached to an aperture lamp can be made more compact than an assembly composed of an equivalent symmetrical CEC attached to an aperture lamp. FIG. 7 shows the imaging system 100 having the asymmetrical compound elliptical concentrator 101. While the first and second reflective surfaces 104 and 106 are arcs of two dimensionally-dissimilar ellipses, the untruncated asymmetrical compound elliptical concentrator 103 satisfies the extreme ray condition that characterizes compound elliptical concentrators. The extreme rays 105 and 107 are shown in FIG. 7. Light from the light source 12 is returned from the surface 23 of the object 22 and is coupled to the detector 28 by passing through the opening 114 in the second reflective surface 106.

The detector 28 may be an electrical device, such as a CCD or a photodiode, or may be the components of a conventional photocopier. The light coupled to the detector may or may not form an image at the detector. The optical elements 30 that collect the light returned from the surface 23 may be used to increase the intensity of the light coupled to the detector.

While not shown, an asymmetrical compound elliptical concentrator may be truncated in the same manner as that described above with reference to FIG. 5 for a symmetrical concentrator. The truncated asymmetrical concentrator may be sufficiently tilted relative to the surface 23 of the object 22 to allow light returned from the surface 23 to be coupled to the detector 28 withouth the returned light passing back into the CEC.

Although this disclosure describes illustrative embodiments of the invention in detail, it is to be understood that the invention is not limited to the precise embodiments described, and that various modifications may be practiced within the scope of the invention defined by the appended claims.

I claim:

1. An imaging system for imaging a surface of an object to a detector, the imaging system comprising:

a compound elliptical concentrator having an entry aperture and an exit aperture and including a first reflective surface and a second reflective surface, the first reflective surface being a portion of a first ellipse having a first focus generally at an entry end of the second reflective surface and having a second focus, the second reflective surface being a portion of a second ellipse having a third focus generally at an entry end of the first reflective surface and having a fourth focus, the compound elliptical concentrator being positioned with the exit aperture juxtaposed to the surface of the object so as to substantially maximize an illumination intensity of the surface of the object;

an elongate light source positioned to illuminate the entry aperture of the compound elliptical concentrator; and coupling means for coupling light returned from the surface of the object to the detector.

2. The system of claim 1, in which:

the first and second reflective surfaces are on opposite sides of a plane of symmetry of the compound elliptical concentrator; and the elongate light source has a lengthwise axis generally coincident with the plane of symmetry.

3. The system of claim 1, in which the second and fourth foci are substantially at extremes of the exit aperture.

4. The system of claim 1, in which:

the compound elliptical concentrator has an axis of symmetry extending from the light source through the exit aperture; and the axis of symmetry is at an angle relative to a normal to the surface of the object such that the compound elliptical concentrator is tilted relative to the surface of the object.

5. The system of claim 4, in which the second and fourth foci are on opposite sides of the surface of the object.

6. The system of claim 1, in which the coupling means includes an opening formed in the second reflective surface.

7. The system of claim 6, in which the coupling means additionally includes at least one optical element located between the first and second reflective surfaces, the optical element operating to direct the reflected light from the surface of the object to the detector.

8. The system of claim 1, in which the compound elliptical concentrator defines an illumination pattern on the surface of the object, the illumination pattern having a width generally parallel and equal to a distance between the first and third foci.

9. An imaging system for imaging a surface of an object, the imaging system comprising:

a compound elliptical concentrator having an entry aperture and an exit aperture and including a first reflective surface and a second reflective surface, the first reflective surface being a portion of a first ellipse having a first focus generally at an entry end of the second reflective surface and having a second focus, the second reflective surface being a portion of a second ellipse having a third focus generally at an entry end of the first reflective surface and having a fourth focus, the compound elliptical concentrator being positioned with the exit aperture juxtaposed to the surface of the object so as to substantially maximize an illumination intensity of the surface of the object;

an elongate light source positioned to illuminate the entry aperture of the compound elliptical concentrator; and a detector positioned to receive directly light returned from the surface of the object illuminated by light from the compound elliptical concentrator.

10. The system of claim 9, in which the second and fourth foci are substantially at extremes of the exit aperture.

11. The system of claim 9, in which:

the compound elliptical concentrator has an axis of symmetry extending from the light source through the exit aperture; and the axis of symmetry is at an angle relative to a normal to the surface of the object such that the compound elliptical concentrator is tilted relative to the surface of the object.

12. The system of claim 9, additionally comprising coupling means, including an opening formed in the second reflective surface, for coupling the light returned from the surface of the object to the detector.

13. The system of claim 12, in which the coupling means additionally includes at least one optical element located between the first and second reflective surfaces, the optical element operating to direct the reflected light from the surface of the object to the detector.

14. An imaging system for imaging a surface of an object, the imaging system comprising:

an elongate light source;

a compound elliptical concentrator having an entry aperture and an exit aperture, the light source being fixed at the entry aperture, the compound elliptical concentrator having first and second reflective surfaces on opposed sides of a plane of symmetry, the reflective surfaces being arcs of different ellipses and being positioned relative to each other and to the light source such that multiple reflections of extreme rays from the entry aperture to the exit aperture are deterred, the compound elliptical concentrator being positioned at a distance from the surface such that dimensions of an illumination field on the surface are substantially equal to dimensions of the entry aperture; and a light detector positioned to sense light returned from the surface of the object.

15. An imaging system for imaging a surface of an object to a detector, the imaging system comprising:

an elongate light source;

a compound elliptical concentrator having an entry aperture and an exit aperture, the light source being fixed at the entry aperture, the compound elliptical concentrator having first and second reflective surfaces on opposed sides of a plane of symmetry, the reflective surfaces being arcs of different ellipses and being positioned relative to each other and to the light source such that multiple reflections of extreme rays from the entry aperture to the exit aperture are deterred, the second reflective surface defining an opening, the plane of symmetry of the compound elliptical concentrator being tilted relative to the surface; and a detector aligned with the opening to receive light returned from the surface of the object.

16. An imaging system for imaging a surface of an object to a detector, the imaging system comprising:

an elongate light source, a compound elliptical concentrator having an entry aperture and an exit aperture, the light source being fixed at the entry aperture, the compound elliptical concentrator having first and second reflective surfaces on opposed sides of a plane of symmetry, the reflective surfaces being arcs of different ellipses and being positioned relative to each other and to the light source such that multiple reflections of extreme rays from the entry aperture to the exit aperture are deterred, the compound elliptical concentrator being positioned with the exit aperture juxtaposed to the surface of the object so as to substantially maximize an illumination intensity of the surface of the object; and means for coupling light returned from the surface of the object to the detector.

17. The imaging system of claim 16, in which the compound elliptical concentrator is positioned at a distance from the surface such that dimensions of an illumination field on the surface are substantially equal to dimensions of the entry aperture.

18. The imaging system of claim 16, in which the plane of symmetry of the compound elliptical concentrator is tilted relative to the surface.

\* \* \* \* \*